United States Patent [19]
Sorkin

[11] Patent Number: 5,482,136
[45] Date of Patent: Jan. 9, 1996

[54] ANTI-THEFT GAS PEDAL LOCK

[76] Inventor: Mikhail Sorkin, 337 E. 41st. St., New York, N.Y. 10017

[21] Appl. No.: 254,591

[22] Filed: Jun. 6, 1994

[51] Int. Cl.$^6$ ................................................ B60R 25/00
[52] U.S. Cl. ............................... 180/287; 70/202; 70/237
[58] Field of Search .................................... 180/287, 271; 70/201, 202, 203, 200, 199, 198, 237

[56] References Cited

U.S. PATENT DOCUMENTS

| | | | |
|---|---|---|---|
| 1,333,093 | 3/1920 | Pierce | 70/203 |
| 1,400,243 | 12/1921 | Siwecki | 70/199 |
| 1,423,955 | 7/1922 | Miller | 70/203 |
| 1,442,203 | 1/1923 | Williams et al. | 70/202 |
| 1,493,384 | 5/1924 | Rasmus | 70/199 |
| 4,076,095 | 2/1978 | Adamski | 180/287 |
| 4,333,326 | 6/1982 | Winters | 70/203 |
| 5,282,373 | 2/1994 | Riccitelli | 70/202 |

FOREIGN PATENT DOCUMENTS 2223726 4/1990 United Kingdom ................... 180/287

*Primary Examiner*—Kenneth R. Rice
*Assistant Examiner*—Peter C. English
*Attorney, Agent, or Firm*—Ilya Zborous

[57] ABSTRACT

A vehicle anti-theft device has a support to be arranged in an interior of a vehicle in the vicinity of a gas pedal, and a locking part arranged on the support and having a locking body provided with an opening and a locking element movable relative to the locking body between a locked position in which it reduces a size of the opening and an unlocked position in which it releases the opening, so that in the unlocked position the device can be moved over a gas pedal of the vehicle and a holding arm of of the gas pedal, while in the locked position with reduced size of the opening the device cannot be removed from the holding of the gas pedal since the size of the opening in the locked position is smaller than the size of the gas pedal, and therefore the gas pedal cannot be activated to drive a vehicle.

3 Claims, 3 Drawing Sheets

ANTI-THEFT GAS PEDAL LOCK

BACKGROUND OF THE INVENTION

The present invention relates generally to a vehicle anti-theft device.

Many vehicle anti-theft devices are designed and used in practical applications. Some of them are formed so as to block a steering wheel, others are formed to block a driver seat, still other devices are formed so as to block unauthorized entry into the vehicle. It is to be clear that further more efficient devices and further modifications of Q the existing devices are needed to increase their reliability of anti-theft protection of vehicles.

SUMMARY OF THE INVENTION

Accordingly, it is an object of the present invention to provide a vehicle anti-theft device which has an improved reliability with respect to preventing an unauthorized person from driving a vehicle.

In keeping with these objects and with others which will become apparent hereinafter, one feature of the present invention resides, briefly stated, in a vehicle anti-theft device which has a support adapted to be placed in an interior of the vehicle, and a locking element having a body with an opening dimensioned so that a gas pedal and its holding arm can pass through the opening and into the interior of the opening in unlocked condition of the device, and a locking element movable relative to the locking body so as to limit said opening in such a way that the holding arm of the gas pedal can extend through the opening but the device cannot be removed from the holding arm since the opening becomes smaller than the gas pedal and therefore the device reliably prevents the gas pedal from being activated.

When the device is designed in accordance with the present invention it reliably prevents an unauthorized person from using the gas pedal. In other words, an unauthorized person cannot press the gas pedal and therefore drive the vehicle. Since the device is associated with the gas pedal, it is located in a very narrow space in the region of the gas pedal and therefore it is impossible or at least extremely difficult to use any tools which an unauthorized person would intend to use to remove the anti-theft device in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
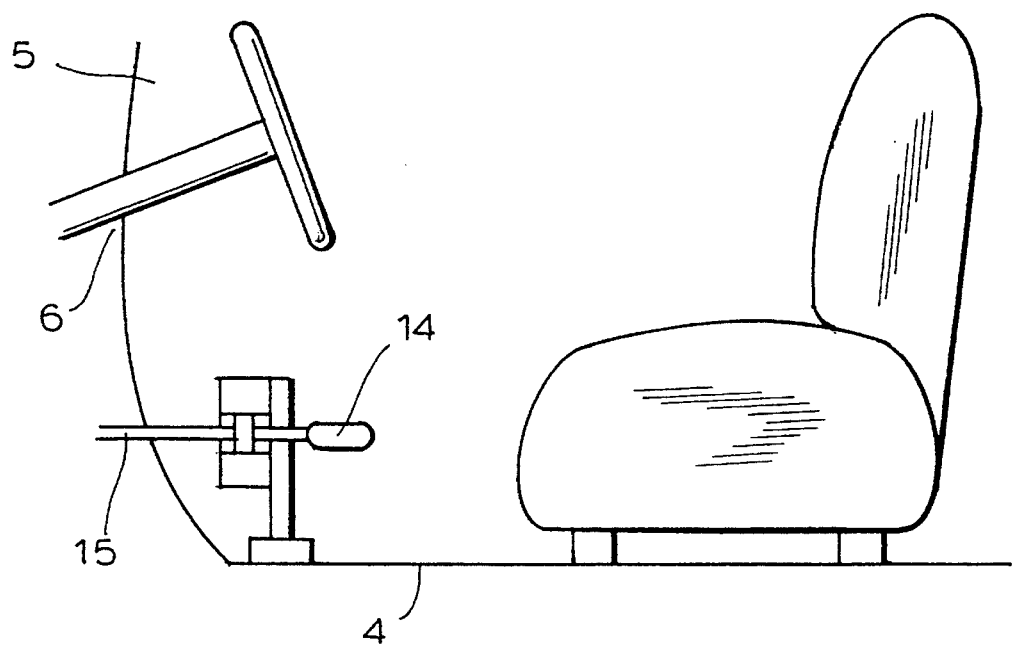
FIG. 1 is a view showing a device in accordance with the present invention in an interior of the vehicle.
Figures 2, 3, 5:
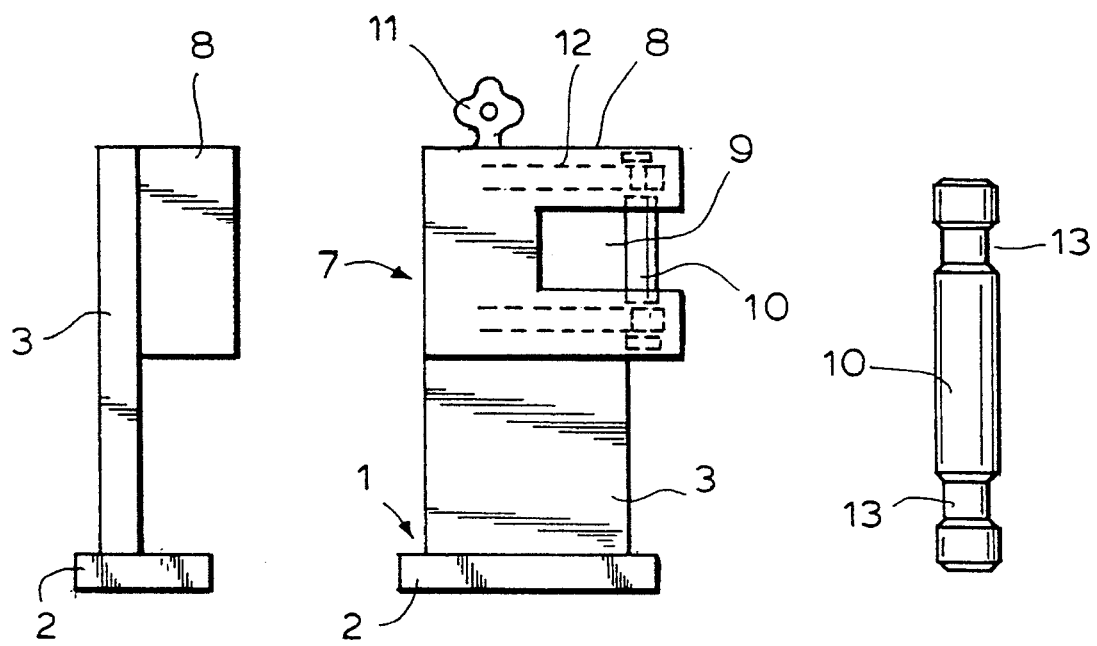
FIG. 2 is a rear view of the device as seen from the vehicle driver seat in accordance with the present invention.
FIG. 3 is a side view of the device in accordance with the present invention.
FIG. 5 is a view showing a locking element of the device in accordance with the present invention.

An anti-theft device in accordance with the present invention has a support which is identified with reference numeral 1 and includes a substantially horizontal part 2 and a substantially vertical part 3 firmly connected with one another. Parts 2 and 3 can be made of one piece with one another or can be welded with one another, etc. The support 1 is formed so that it can be installed on a floor 4 of an interior space 5 of a vehicle 6 as shown in FIG. 1. The device further has a locking part which is identified as a whole with reference numeral 7. The locking part 7 has a locking body which is identified with reference numeral 8 and forming an opening 9, and a locking element 10 which is substantially vertically displaceable relative to the locking body. The locking part 7 can be formed similar to a conventional lock. It has a key hole through which a key 11 can be inserted and acts on bars 12, which under the action of turning of the key 11 are displaced in the horizontal direction in installed position of the device. The locking element 10 is provided with two grooves 13, so that the bars in the locked condition can engage in the grooves 13 of the locking element 10. The support 1 and the locking part 7 can be formed of one piece with one another, welded with one another, etc.

Figure 2A:
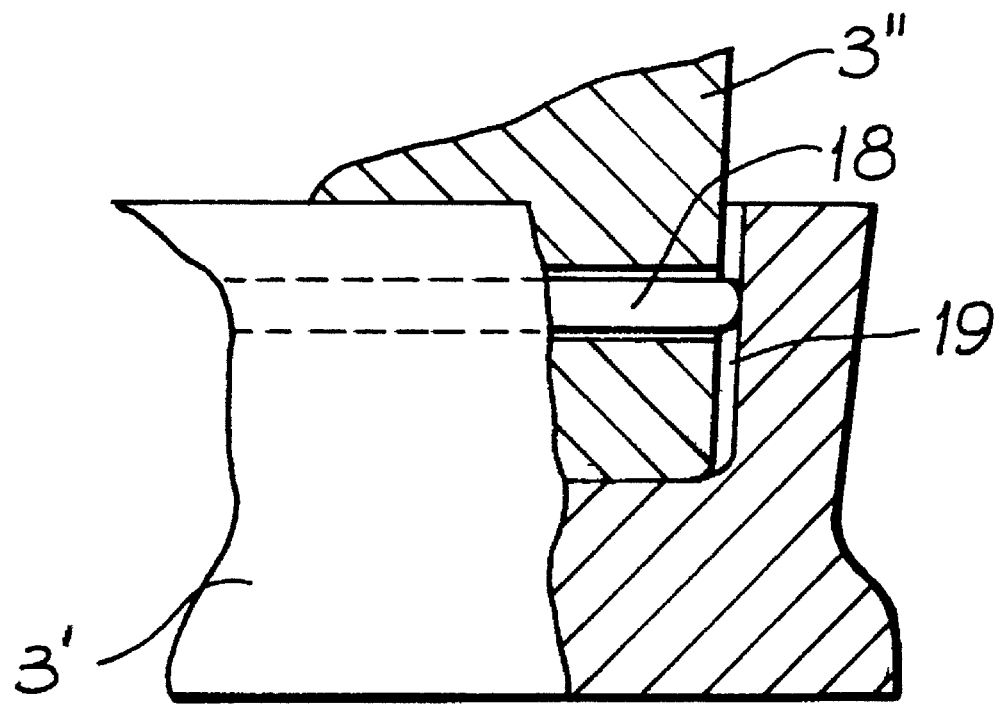
FIG. 2A is a view substantially corresponding to the view of FIG. 2 but in an open position of the locking device.
Figure 4:
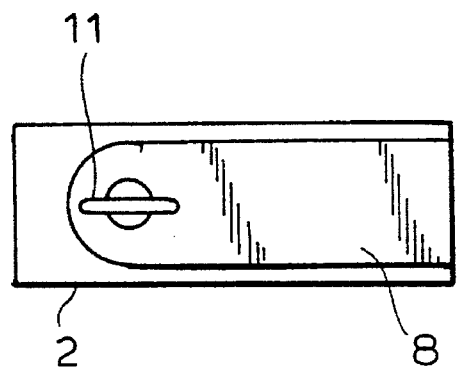
FIG. 4 is a plan view of the device in accordance with the present invention.

The opening 9 of the locking body 8 is formed in a special inventive way. In particular, when the locking element 10 is displaced downwardly by a user as shown in FIG. 2A, both the pedal 14 and the holding arm 15 for the pedal 14 can pass into the opening. In other words, the device as a whole can be placed on the holding arm 15 by moving the device onto the unit so that the device is located in the region of the holding arm 15 while the pedal 14 extends inwardly beyond the device into the interior of the vehicle space 5. Then when the locking element 10 is moved upwardly by the user or under the action of a spring (not shown) located in the locking part 7, and the key 11 is turned, the locking bars 12 engage into the grooves 13 of the locking element 10 and the locking part is locked. After the locking of the locking part, the device cannot be removed from the holding arm 15, since the reduced size of the opening 9 is smaller than the transverse size of the gas pedal 14. Thus, in the locked position of the device, the anti-theft device in accordance with the present invention is reliably held on the holding arm 15, it cannot be removed from the holding arm, and at the same time the gas pedal 14 cannot be pressed downwardly since it abuts against the lower wall of the locking part 7 which limits the opening 9 from below. As a result the car cannot be driven by an unauthorized person.

When an authorized person is willing to drive the vehicle, he or she turns the key in an opposite direction, moves the locking element downwardly, and removes the device from the unit of gas pedal 14, holding arm 15 so as to release the gas pedal 14. The gas pedal 14 can be depressed and the vehicle can be driven.

Figure 6:
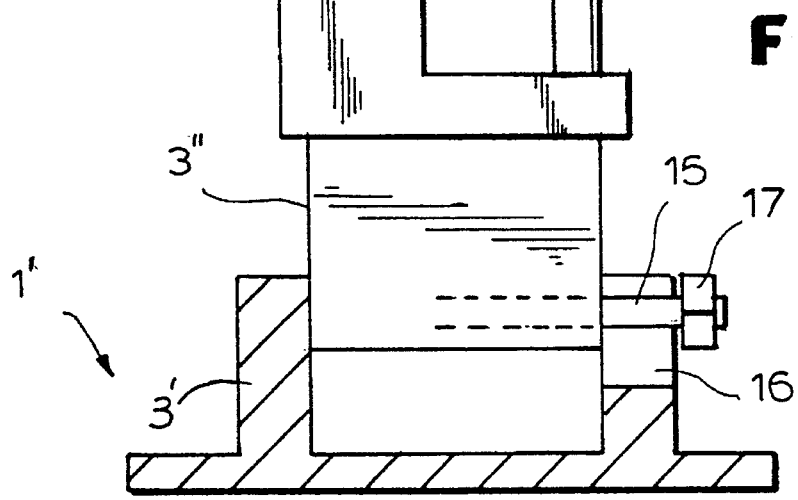
FIG. 6 is a view showing a further modification of the inventive device in accordance with the present invention.

In accordance with a further embodiment of the present invention which is shown in FIG. 6, the device is designed so that it can be adjusted to different heights of gas pedals in different vehicles. In this embodiment the support 1' has a vertical part composed of two telescopable members 3' and 3" movable in one another. The telescopable member 3" has a threaded projection 15 while the telescopable member 3' has a vertical groove 16. When the device is mounted in the vehicle, the members 3' and 3" are adjusted relative to one another depending on the height of the pedal over the floor of the vehicle, and the parts 3', 3" can be tightened in their adjusted position by tightening a nut 17 on the threaded projection 15 of the part 3". Once adjusted, the opening 9 of the device is located at the height corresponding to the height of the pedal 14 and the holding arm 15 in a particular vehicle, and can be used repeatedly by the owner of the vehicle.

Figure 7:
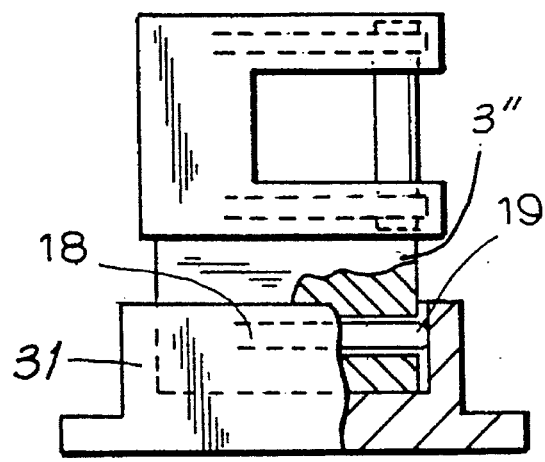
FIG. 7 is a view showing a further embodiment of the present invention.

In accordance with a further embodiment of the present invention which is shown in FIG. 7, when the members 3' and 3" of the support are adjusted to the desired height, an additional bar 18 is extended during turning of the key and engages into a groove 19 of the member 3' so as to hold the members 3' and 3" in the adjusted position.

It should be mentioned that the locking part 7 is formed as a well know lock, and a transmission between a drum in which the key 11 is inserted and the locking bars 12, 18 is the same as in the known locks and thereby is not described in detail. Upon locking, the key 11 is removed from the locking part by user.

It will be understood that each of the elements described above, or two or more together, may also find a useful application in other types of constructions differing from the types described above.

While the invention has been illustrated and described as embodied in a vehicle anti-theft device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A vehicle anti-theft device, comprising a support to be arranged in an interior of a vehicle in the vicinity of a gas pedal arranged on a holding arm; and a locking part arranged on said support and having a locking body provided with an opening having an unbounded side and a locking element movable relative to said locking body between a locked position in which it closes said unbounded side of said opening and an unlocked position in which it opens said unbounded side of said opening, so that in said unlocked position the device can be moved over a gas pedal of the vehicle and a holding arm, while in said locked position with said closed unbounded side of the opening the device cannot be removed from the holding arm and the gas pedal since the size of the opening in the locked position is smaller than the size of the gas pedal, and therefore the gas pedal cannot be activated to drive a vehicle, said locking part having at least one engaging element which cooperates with said locking element so as to engage and hold said locking element or to disengage said locking element and allow its displacement, a key hole, and a key insertable in said key hole and movable so as to activate said at least one engaging element to engage said locking element and to disengage from said locking element, said support being composed of at least two parts which are telescopable relative to one another so as to adjust a position of said opening relative to a position of a gas pedal in a vehicle, said locking part having an additional engaging element which is moveable in one of said telescopable parts under the action of said key so as to engage the other of said telescopable parts and fix said telescopable parts relative to one another in an adjusted position.

2. A vehicle anti-theft device is defined in claim 1, wherein said support has a substantially horizontal part adapted to be installed on the floor of the vehicle, and wherein a first of said telescopable parts is a vertical part which is connected to said horizontal part and a second of said telescopable parts is a vertical part which carries said locking part.

3. A vehicle anti-theft device as defined in claim 1, wherein said at least one engaging element comprises two engaging elements such operative for engaging with and disengaging from said locking element.

* * * * *